US007957268B2

(12) United States Patent
Appanna et al.

(10) Patent No.: US 7,957,268 B2
(45) Date of Patent: *Jun. 7, 2011

(54) COOPERATIVE TCP / BGP WINDOW MANAGEMENT FOR STATEFUL SWITCHOVER

(75) Inventors: Chandrashekhar Appanna, Cupertino, CA (US); Anantha Ramaiah, Sunnyvale, CA (US); Lester S. Bird, Tracy, CA (US)

(73) Assignee: Cisco Technology, Inc., San Jose, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 12/418,913

(22) Filed: Apr. 6, 2009

(65) Prior Publication Data
US 2009/0219805 A1 Sep. 3, 2009

Related U.S. Application Data

(63) Continuation of application No. 10/948,732, filed on Sep. 22, 2004, now Pat. No. 7,515,525.

(51) Int. Cl.
*H04L 12/26* (2006.01)
(52) U.S. Cl. ..................................... 370/217; 370/503
(58) Field of Classification Search .................. None
See application file for complete search history.

(56) References Cited

U.S. PATENT DOCUMENTS

| 7,406,037 | B2 * | 7/2008 | Okita | 370/218 |
| 2005/0265346 | A1 * | 12/2005 | Ho et al. | 370/392 |
| 2007/0248108 | A1 * | 10/2007 | Visser et al. | 370/401 |
| 2009/0129261 | A1 * | 5/2009 | Visser et al. | 370/219 |

* cited by examiner

*Primary Examiner* — Anh-Vu Ly
(74) *Attorney, Agent, or Firm* — Tucker Ellis & West LLP

(57) ABSTRACT

A system and method for performing stateful switchover with reduced data, such as only metadata about a TCP window state. The metadata comprises a size of TCP packets used to send BGP messages, and which of those have been acknowledged by a neighbor networking device. The networking device comprises a BGP module to establish a BGP session between the networking device and a neighbor networking device. An active transport module within the networking device synchronizes with a standby transport module within the networking device by sending the metadata. A fault detector within the networking device initiates a stateful switchover from the active transport module to the standby transport module responsive to detecting a failure of a process and/or processor. The standby transport module uses the metadata to determine stateful metadata for preserving current BGP and TCP sessions of the networking device.

20 Claims, 10 Drawing Sheets

COOPERATIVE TCP / BGP WINDOW MANAGEMENT FOR STATEFUL SWITCHOVER

CROSS-REFERENCE TO RELATED APPLICATIONS

This application is a continuation of U.S. application Ser. No. 10/948,732, filed on Sep. 22, 2004 now U.S. Pat. No. 7,515,525.

TECHNICAL FIELD

The present disclosure relates generally to computer networking, and more specifically, to a networking device for maintaining statefulness between an active process and/or processor and a standby process and/or processor for stateful switchover.

BACKGROUND

High availability is essential for critical networking resources such as edge routers. An edge router typically serves as a single point of communication between computers on a network and computers outside the network. When a processor or communication process within the edge router experiences a failure, internetworking communication with the network is precluded. In response, edge routers have been equipped with redundant resources that activate at failure.

One problem with redundant resources is that communications are disrupted while the edge router restores contact with network nodes. During operation, applications, higher-layer protocols, lower-layer protocols, and the like form complex layers of interdependent data. For example, edge routers using Border Gateway Protocol (BGP) to make routing decisions can require establishment of a BGP session and a Transmission Control Protocol (TCP) session. In order to restore operations after a failure, the redundant resources typically must reestablish communication with network nodes on several different levels before resuming communications (e.g., establish new TCP and BGP sessions). While resultant downtime may be less than that of rebooting or otherwise repairing failed resources, the edge router is nevertheless unavailable during this time. One approach to reducing downtime is to replicate all data transactions to the standby resources for a faster transition.

However, data replication requires significant resources. For example, current edge routers replicate data using the brute force of large bandwidth data channels to send duplicate input, output, and other data to standby resources. As a result, the processor inherits an additional burden that affects ordinary operations. Alternatively, specialized hardware can be dedicated to off-load the replication tasks. However, this increases the complexity and expense of processor design and requires significant silicon area. Furthermore, modern and future network bandwidths, operating at speeds of 10-Gb/s, 40-Gb/s and beyond, exacerbate these design requirements. Thus, current high availability techniques requires a trade-off between downtime and the requirements of data replication.

Accordingly, there is a need for a robust networking device that maintains statefulness between an active process and/or processor and a standby process and/or processor with reduced checkpointing data. Furthermore, this solution should perform stateful switchovers that continue existing BGP and TCP sessions.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1A:
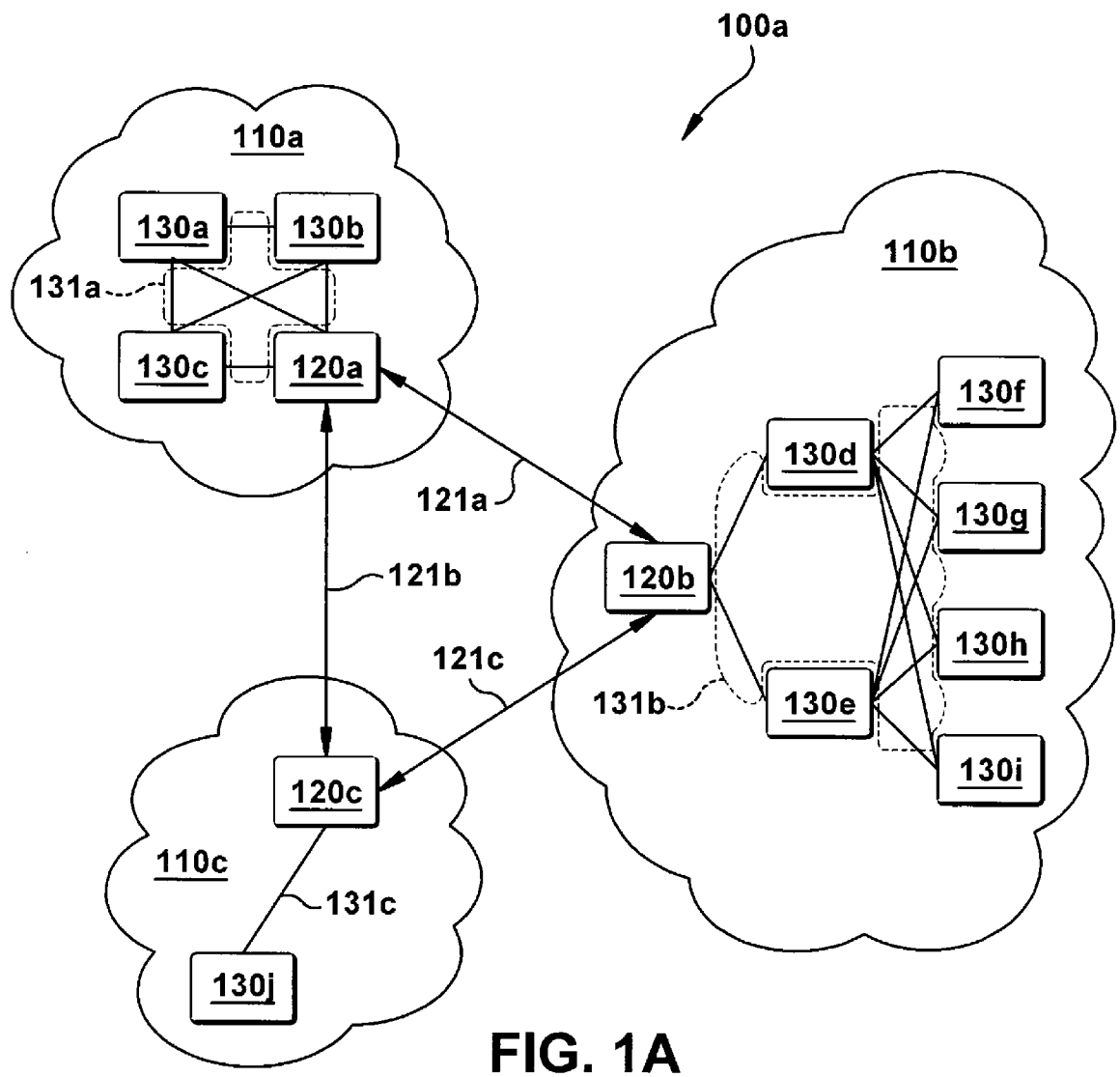
FIGS. 1A-B are block diagrams illustrating a stateful switchover system according to one embodiment of the present invention.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

The present invention meets these needs with a system and method for performing stateful switchover with reduced data, such as metadata. Advantageously, the networking device sends significantly less data to standby resources resulting in a smaller, less complex, and less expensive design. Moreover, statefulness allows the standby resources to maintain existing Border Gateway Protocol (BGP) and Transmission Control Protocol (TCP) sessions, thereby reducing downtime for the networking device.

In one embodiment, the networking device comprises a BGP module coupled to an active transport module and a standby transport module. The BGP module can establish a BGP session between the networking device and a neighbor networking device. The active transport module, coupled to the standby transport module, maintains statefulness by sending metadata about a TCP window state. The metadata comprises, for example, data about the size of TCP packets sent, and which of those packets the neighbor networking device has acknowledged.

In another embodiment, a fault detector, coupled to the BGP module, the active transport module, and the standby transport module, initiates a stateful switchover from the active transport module to the standby transport module responsive to detecting a failure of a process and/or a processor. The standby transport module uses the metadata to determine stateful metadata for preserving current BGP and/or TCP sessions of the networking device. In one embodiment, the standby transport module generates dummy TCP packets that are the same size as sent TCP packets. Rather than the BGP message data of the sent TCP packet, the dummy packet includes a safe BGP message data, such as a KEEPALIVE or WITHDRAW message.

In still another embodiment, the BGP module configures a TCP module within the active transport module. A first configuration sets-up the TCP module to perform checkpointing without sending BGP message data. A second configuration prevents the TCP module from fragmenting BGP messages across different PDUs.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

A system and method for stateful switchover are disclosed. Some embodiments of the system are set forth in FIGS. 1-4, and some embodiments of the method operating therein are set forth in FIGS. 5-10. The accompanying description is for the purpose of providing a thorough explanation with numerous specific details. Of course, the field of computer networking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. Accordingly, the present invention should not be understood as being limited to the specific implementations described below, but only by the claims that follow.

The processes, features, or functions of the present invention can be implemented by program instructions that execute in an appropriate computing device described below. The program instructions can be distributed on a computer readable medium, within a semiconductor device, or through a public network. Program instructions can be in any appropriate form, such as source code, object code, or scripts.

FIG. 1A is a block diagram illustrating a stateful switchover system 100a according to one embodiment of the present invention. The system 100a comprises, for example, the Internet, modular components of a private network, a combined data and voice networking, and the like. In this example, the system 100a includes autonomous systems 110 (collectively referring to 110a-c) coupled in communication over a network medium 121 (collectively referring to 121a-c) preferably using a reliable transmission protocol such as TCP over IP or some other connection-oriented transport service. The autonomous systems 110 further comprise interior networking devices 130 (collectively referring to 130a-j), including at least one exterior networking device 120 (collectively referring to 120a-c), coupled in communication over a networking medium 131 (collectively referring to 131a-c) using a transport protocol such as TCP or UDP over IP, and the like. Other network configurations are contemplated to be within the scope of the present invention. Generally, the system 100a provides high availability end-to-end routing with persistent exterior communications despite failures within exterior networking devices 120.

The autonomous system 110a comprises the exterior networking device 120a and interior networking devices 130a-c. Because a mesh topology provides highly redundant internal communication routes, a single networking device failure will not disrupt communication between other networking devices. Similarly, the autonomous system 10b comprises the neighbor networking device 120b and interior networking devices 130d-i. Again, a combination of a tree and mesh topology provides redundant internal communication routes. Finally, the autonomous system 110c comprises the exterior networking device 120c directly coupled to an interior networking device 130j.

Networking devices within the autonomous systems 110 are often homogeneous with respect to the system 100a as the autonomous systems 110 often correspond to an enterprise network of a business enterprise, a LAN, a WAN, a VLAN, an ISP, a storage networking, or any other modular networking. Routing within the autonomous systems 110 can use an interior routing protocol such as Interior Border Gateway Protocol (IBGP), Interior Gateway Protocol (IGP), Interior Gateway Routing Protocol (IGRP), Enhanced IGRP (EIGRP), Routing Information Protocol (RIP), Open Shortest Path First (OSPF) protocol, and the like. The interior routing protocol can be customizable to meet requirements within the autonomous system 110. The interior networking device 130 can be the same device as the exterior networking device 120, or any other networking device capable of routing packets within the autonomous systems 110.

To the contrary, as a single point of failure without redundancy, networking devices at the edge of an autonomous system 110 are critical to internetworking communication between different autonomous systems 110 (e.g., between 130a and 130j). Thus, according to one embodiment of the present invention, the exterior networking devices 120 maintain statefulness between active and standby processes and/or processors in order to perform a stateful switchover as necessary. In another embodiment, the exterior networking devices 120 sends metadata rather than data itself to reduce processing overhead in checkpointing. Using metadata during a stateful switchover, the exterior networking device 120 able to maintain, for example, current BGP and TCP sessions. Advantageously, after a failure of active resources, the exterior networking devices 120 continue to process internetwork communications through standby resources with minimal disruption.

Figure 1B:
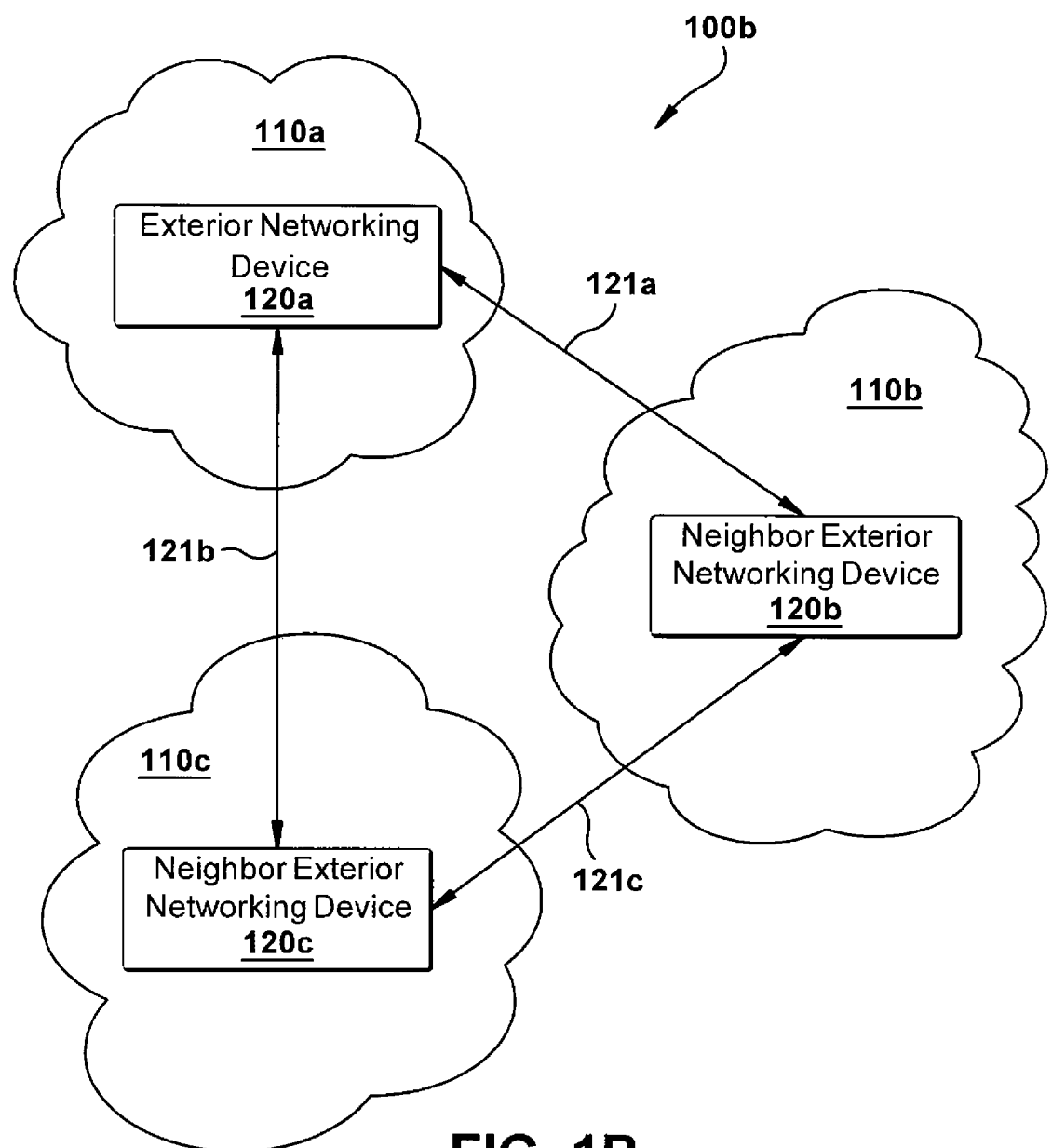

The exterior routers 120 make router-to-router decisions with routing algorithms using routing information obtained through exterior routing protocols such as BGP or Exterior Gateway Protocol (EGP). The block diagram of FIG. 1B illustrates the relationship between the exterior networking devices 120. In a stateful switchover system 100b, the exterior networking device 120a obtains routing information from the neighbor exterior networking devices 120b-c. The exterior networking device 120a may need to continually reaffirm its relationship with the neighbor exterior networking devices 120b-c in order to maintain the BGP session. In many systems of the prior art using non-stateful switchover, standby resources must restore this relationship after a transition.

The BGP series of protocols, such as BGP-4 have become the standardized exterior router protocol for the Internet. More specifically, BGP exchanges routing and reachability information amount neighboring exterior networking devices of the system 100b on port 179. Typically, BGP operates by sending messages over a reliable transport protocol such as Transmission Control Protocol (TCP). In one embodiment, the exterior networking device 120a in fact combines widely-used protocols such as BGP over TCP to enable communication with heterogeneous networking devices. The BGP-series of protocols are described more fully in RFC 1105 and RFC 1771, promulgated by the Internet Engineering Task Force (IETF) and hereby incorporated by reference. The exterior networking device 120 can be a router such as a Cisco 12000-series router running Internetworking Operating System (IOS), both manufactured by Cisco Systems, Inc. of San Jose, Calif., a personal computer running Linux, a mobile device, an edge router, or any other networking device capable of routing packets between autonomous systems 110. Note that the present invention contemplates networking devices other than exterior networking devices 120.

Figure 2:
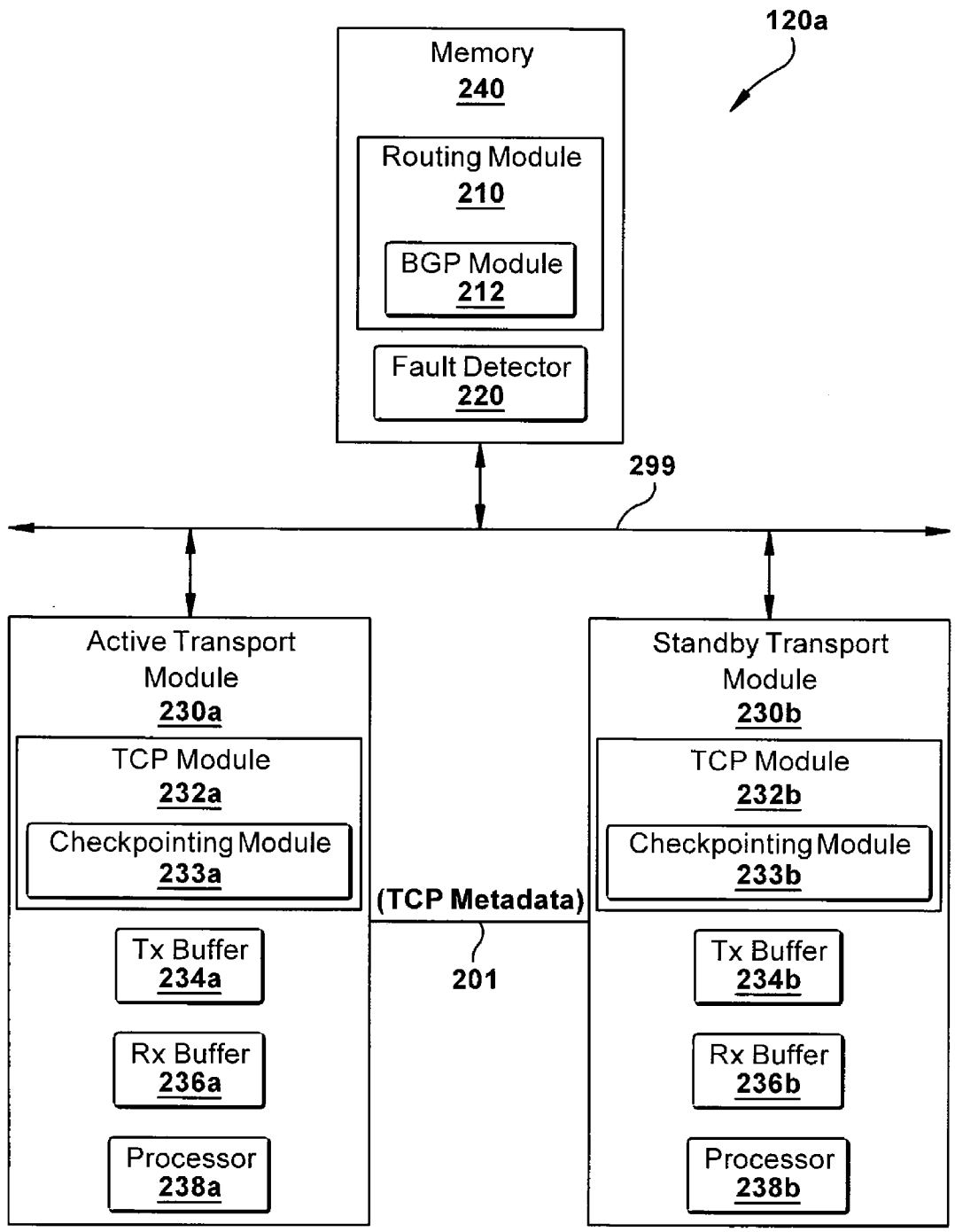
FIG. 2 is a block diagram illustrating an exterior networking device according to one embodiment of the present invention.

FIG. 2 is a block diagram illustrating the exterior networking device 120a according to one embodiment of the present invention. The exterior networking device 120a can operate to service high-speed networks with bandwidths of 2.4-Gbps, 10-Gbps, 40-Gbps, and above. The exterior networking device 120a can also provide services such as application recognition, quality of service guarantees, application-level firewalls, network-based intrusion detection, and the like. The exterior networking device 120a processes incoming packets received from a network (not shown) to perform various tasks such as routing, switching, bridging, and packet forwarding using various networking protocols such as TCP/IP, ATM (Asynchronous Transfer Mode), IEEE 802.3, IEEE 802.11, etc. The exterior networking device 120a sends processed outgoing packets to the network.

In the embodiment of FIG. 2, the exterior networking device 120a comprises a memory 240 having a routing module 210 and a fault detector 220, coupled by a signal line 299 to an active transport module 230a, and a standby transport module 230b. A signal line 201 directly couples the active transport module 230a to the standby transport module 230b. Note, however, that FIG. 2 is merely an exemplary embodiment, as other embodiments can be implemented completely in hardware, have different couplings (e.g., no dedicated signal line 201), etc. At a high-level, the routing module 210 relies on the active transport module 230a to obtain routing information from neighbor exterior networking devices 120b-c in order to make routing decisions for outgoing packets. The active transport module 230a replicates its state in the standby transport module 230b in the event of a stateful switchover to the standby transport module 230b. In the event of a failure, the fault detector 220 redirects BGP message data to the standby transport module 230b, which continues current BGP and TCP sessions.

More specifically, the routing module 210 uses routing algorithms (e.g., distance-vector routing, link-state routing, and the like) to make decisions based on factors such as networking topology, networking congestion, and processing load. The routing module 210 further comprises a BGP module 212 to obtain internetwork routing information using BGP or a variant thereof. The BGP module 212 generates OPEN messages to initiate BGP sessions with other exterior networking devices 120 as described below with respect to FIG. 7. The BGP module 212 can also generate KEEPALIVE messages to acknowledge an OPEN message or continue BGP sessions, UPDATE messages to send routing information to subscribers, NOTIFICATION messages to send error condition, and the like.

Figure 3A:
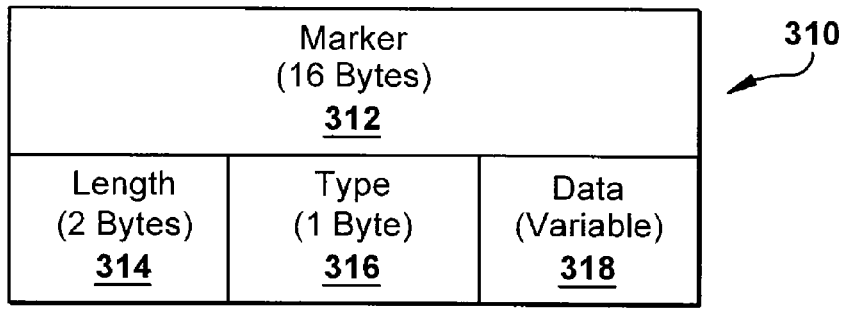
FIGS. 3A-C are block diagrams illustrating network packets according to one embodiment of the present invention.
Figure 3B:
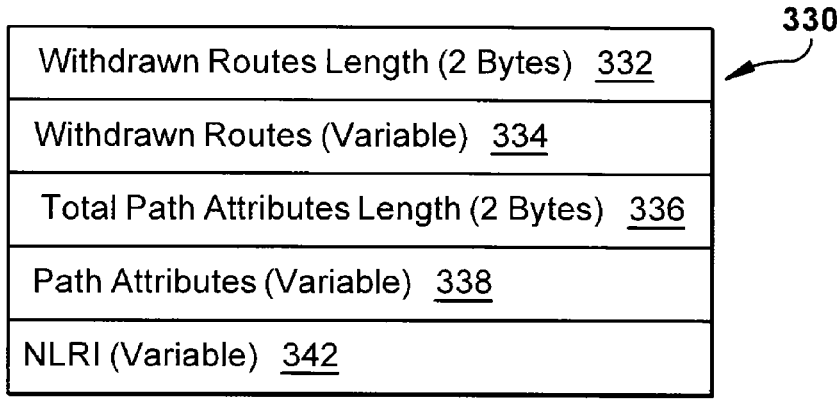

The format of BGP messages is shown in greater detail in FIGS. 3A-B. The block diagram of FIG. 3A illustrates a BGP message header 310 according to one embodiment of the present invention. The BGP message header 310 typically contains the following fields: marker 312 to synchronize multiple messages in a TCP segment; length 314 to indicate total message length; type 316 to indicate a message type; and data 318 to hold the data payload (if there is any), such as BGP message data. The block diagram of FIG. 3B illustrates an UPDATE message 330 according to one embodiment of the present invention. The UPDATE message 330 typically contains the following fields: withdrawn routes length 332 to indicate a length of a withdrawn routes field 334; withdrawn routes 334 to indicate unfeasible routes to be withdrawn from consideration; total path attributes length 336 to indicate the total length of the path attribute information; path attributes 330 to indicate path attributes in a type-length-value format; and NLRI 342 to indicate reachability information. One of ordinary skill in the art will understand that the routing module 130 can implement exterior routing protocols other than BGP and message types other than those described specifically herein.

Returning to FIG. 2, the fault detector 220 can effect a stateful switchover responsive to, for example, detecting a fault, detecting a crash, detecting a process interrupt or stall, poor performance, load distribution, a lack of signaling on the networking medium, or any other condition of a specific design. In one example, the fault detector 220 operates as a daemon so that it may observe thread or process failures through the operating system. In another example, the fault detector 220 passively observes networking traffic at a port where it can determine a lack of response from the active transport module 230a. The fault detector 220 can be implemented in hardware or software.

The active transport module 230a manages a reliable transport service for the BGP module 212 and other communication needs. The active transport module 230a further comprises a TCP module 232a and a processor 238a. Note that the TCP module 232a functionality can be implemented entirely in hardware, such as on a single processor, entirely in software, or as a combination of both. The TCP module 232a establishes TCP connections with neighboring exterior networking devices 120b-c, interior networking devices 130, and the like, as described in greater detail below with respect to FIG. 6. The TCP module 232a also manages active TCP sessions with, for example, TCP windowing of buffers, flow control, sequencing, error control, and the like. The TCP module 230a can also manage a Tx buffer 234a, which queues BGP message data to be sent, and generate TCP packets from this and other data. Additionally, the TCP module 230a can manage an Rx buffer 236a, which queues received TCP packet data, and extract a byte stream. The Tx buffer 234a and the Rx buffer 236a are described in greater detail with respect to FIG. 4. In one embodiment, however, the BGP module 212 sends BGP message data directly over IP without an outside transport service. In another embodiment, the BGP module 212 uses another transport service such as UDP, or a customized internal process.

The TCP module 232a further comprises a checkpointing module 233a to synchronize TCP metadata between the active transport module 230a and the standby transport module 230b. The checkpointing module 233a tracks TCP packets sent from the Tx buffer 234a, and which of those packets have been acknowledged by their destination. In one embodiment, the metadata comprises information related to TCP packet sizes without the corresponding data. In another embodiment, the metadata comprises updates of which TCP packets have been acknowledged by the receiver. The metadata can also comprise additional state information used by processes and/or processors to maintain statefulness. According to these embodiments, checkpoint data is minimalized to reduce processing overhead and/or the need for specialized hardware. In one embodiment, the checkpointing module 233a is configurable (e.g., by the BGP module 212) to checkpoint without sending data, to send non-fragmented BGP message data, and the like.

Figure 3C:
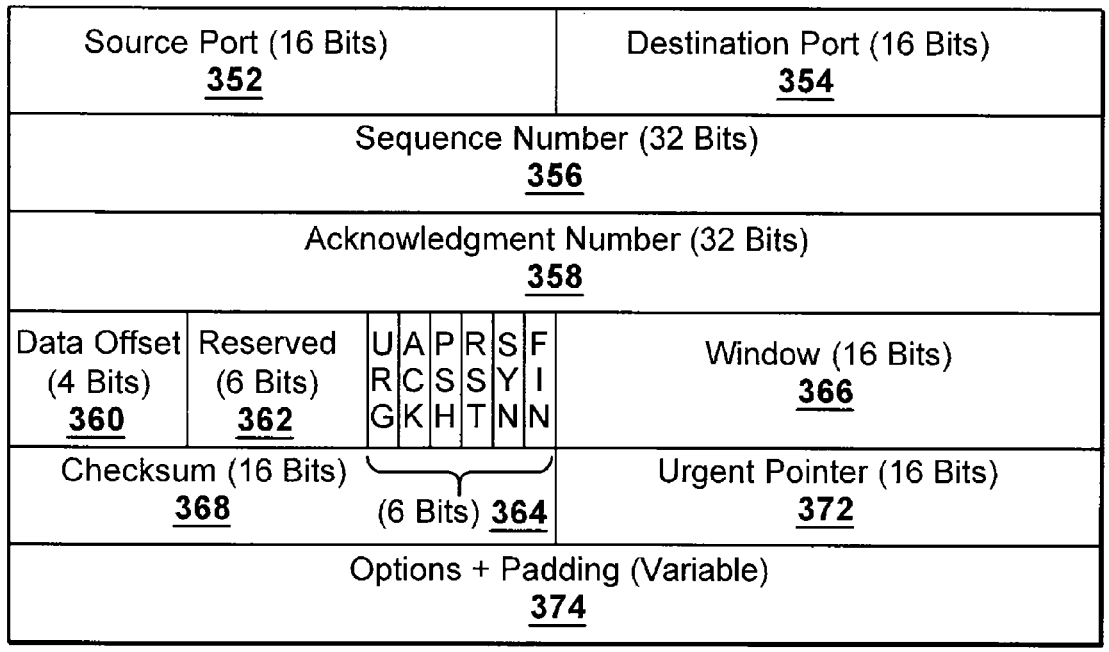

The block diagram of FIG. 3C illustrates a TCP header 350 according to one embodiment of the present invention. The TCP header 350 typically contains the following fields: source port 352 to indicate source service access point; destination port 354 to indicate destination service access port; sequence number 356 to indicate sequence number of the first data octet in this segment (except when SYN flag is set); acknowledgement number 358 contains the sequence number of the next data octet that the TCP entity expects to receive; data offset 360 indicating a number of 32-bit words in the header; reserved 362 which is reserved for future use; flags 364 for specific flags; window 366 to indicate flow control credit allocation; checksum 368 containing the one's complement of the sum modulo $2.^{16}-1$ of all the 16-bit words in the segment, plus a psuedo-header; urgent pointer 372 points to the last octet in a sequence of urgent data; and options and padding 374 indicating the maximum segment size that will be accepted.

Referring again to FIG. 2, the processor 238a executes instructions to support processes within the exterior networking device 120. The processor 238a comprises, for example, an x86-type processor, a networking processor, a multi-threaded processor, a processing core, an ASIC, an FPGA, and the like.

The standby transport module 230b mirrors the active transport module 230a state using data sent from the checkpointing module 233a, such as TCP metadata. The standby transport module 230b becomes active upon receiving a signal for stateful switchover from the fault detector 220. The switchover can be temporary or remain until the standby transport module 230b itself fails. In one embodiment, the standby transport module 230b mirrors data and/or metadata to the active transport module 230a. The standby transport module 230b comprises a TCP module 232b having a checkpointing module 233b, a Tx buffer 234b, an Rx buffer 236b, and a processor 238b. In one embodiment, these components match those of the active transport module 230a. The standby checkpointing module 233b receives data and/or metadata to maintain statefulness with the active Tx buffer 234a. In one embodiment, the standby Tx buffer 234b uses TCP metadata to generate dummy TCP packets without BGP message data corresponding to actual TCP packets. The standby transport module 230b can use either the same logical and/or physical communication ports as the active transport module 230a, or separate ones.

Figure 4:
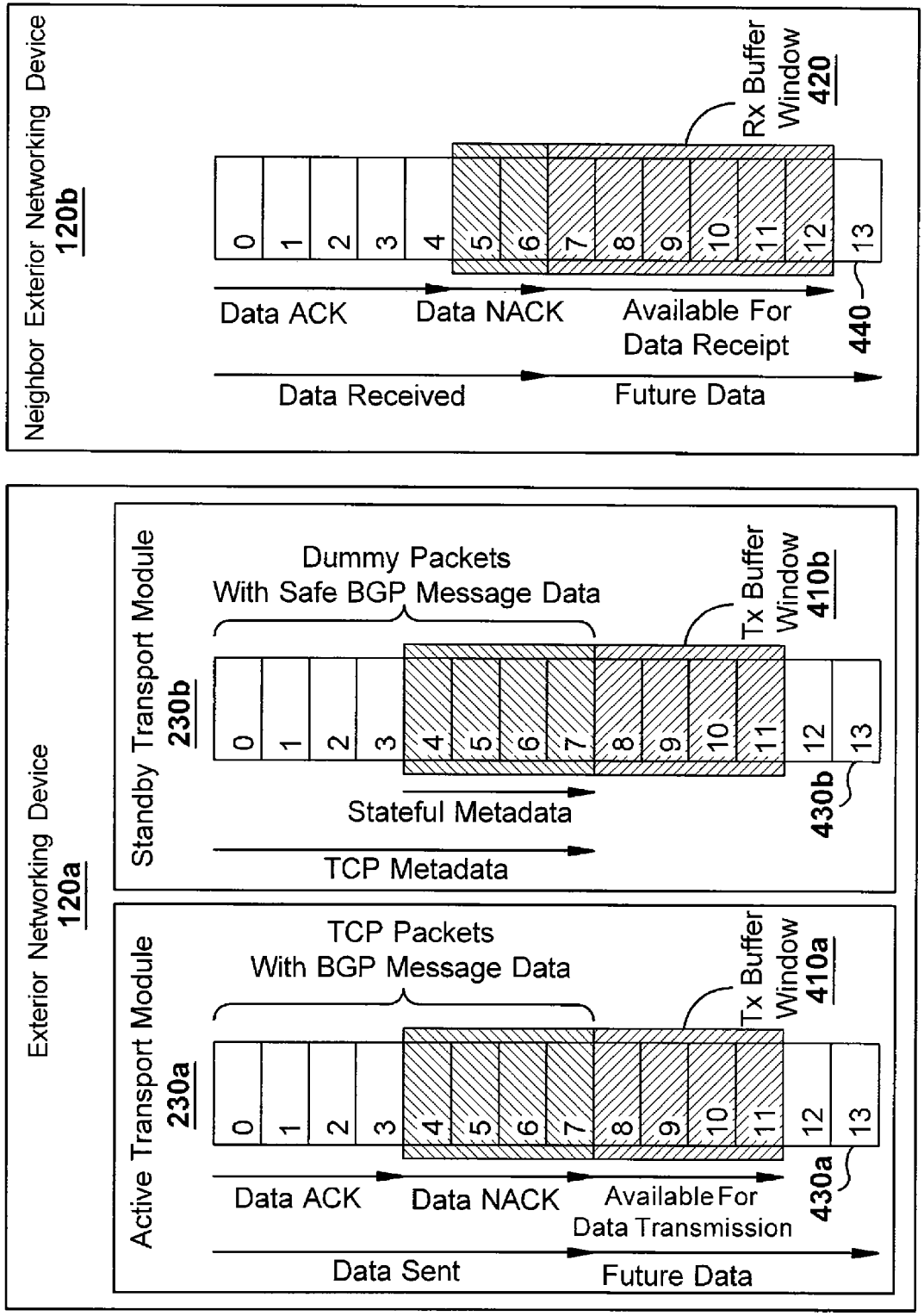
FIG. 4 is a block diagram illustrating TCP windows according to one embodiment of the present invention.

FIG. 4 is a block diagram illustrating TCP windows 410a-b, 420 according to one embodiment of the present invention. The active transport module 230a uses a sliding Tx buffer window 410a to define a current state of the Tx buffer 234a with respect to a data stack 430a comprising a sequential history of data. More specifically, the data stack 430a comprises a sequence of positions for data sent from the Tx buffer 234a and positions of future data. Each position can represent, for example, a whole or partial BGP message, a TCP packet, a PDU, and the like. Out of the sent data, some data has been acknowledged as received by the neighboring exterior networking device 120b (i.e., ACK), and some data has yet to be acknowledged (i.e., NACK). The Tx buffer window 410a, a size of which can be determined by the smallest of the Tx buffer 234a and an Rx buffer of the neighboring exterior networking device 120b (to prevent overflow), comprises data NACK and future data that can be immediately transmitted.

The standby transport module 230b similarly uses a sliding Tx buffer window 410b to define a current sate of the Tx buffer 234b, which is preferably the same as, or slightly delayed from the Tx buffer 234a. In one embodiment, however, a data stack 430b contains metadata about TCP packets rather than the actual data sent in the PDU. The TCP metadata initially comprises information about TCP packet sizes, and after the TCP packet is acknowledged, information about the ACK. When a stateful switchover occurs, it is the TCP packets that have yet to be acknowledged that may need to be resent to keep alive the TCP session as determined by, for example, a retransmission time out or a fast retransmission algorithm. Accordingly, stateful metadata comprises that portion of metadata needed to maintain the TCP session. In another embodiment, the standby transport module 230b generates dummy TCP packets based on the stateful metadata. The dummy packets are the same size as the unacknowledged TCP packets, but contain BGP messages that are harmlessly accepted by the neighboring exterior networking device 120b. When a stateful switchover occurs, the neighboring exterior networking device 120b needs to receive the dummy BGP messages from the exterior networking device 120b to reaffirm their relationship. Accordingly, in still another embodiment, the stateful metadata comprises BGP messages needed to maintain the BGP session.

Figure 5:
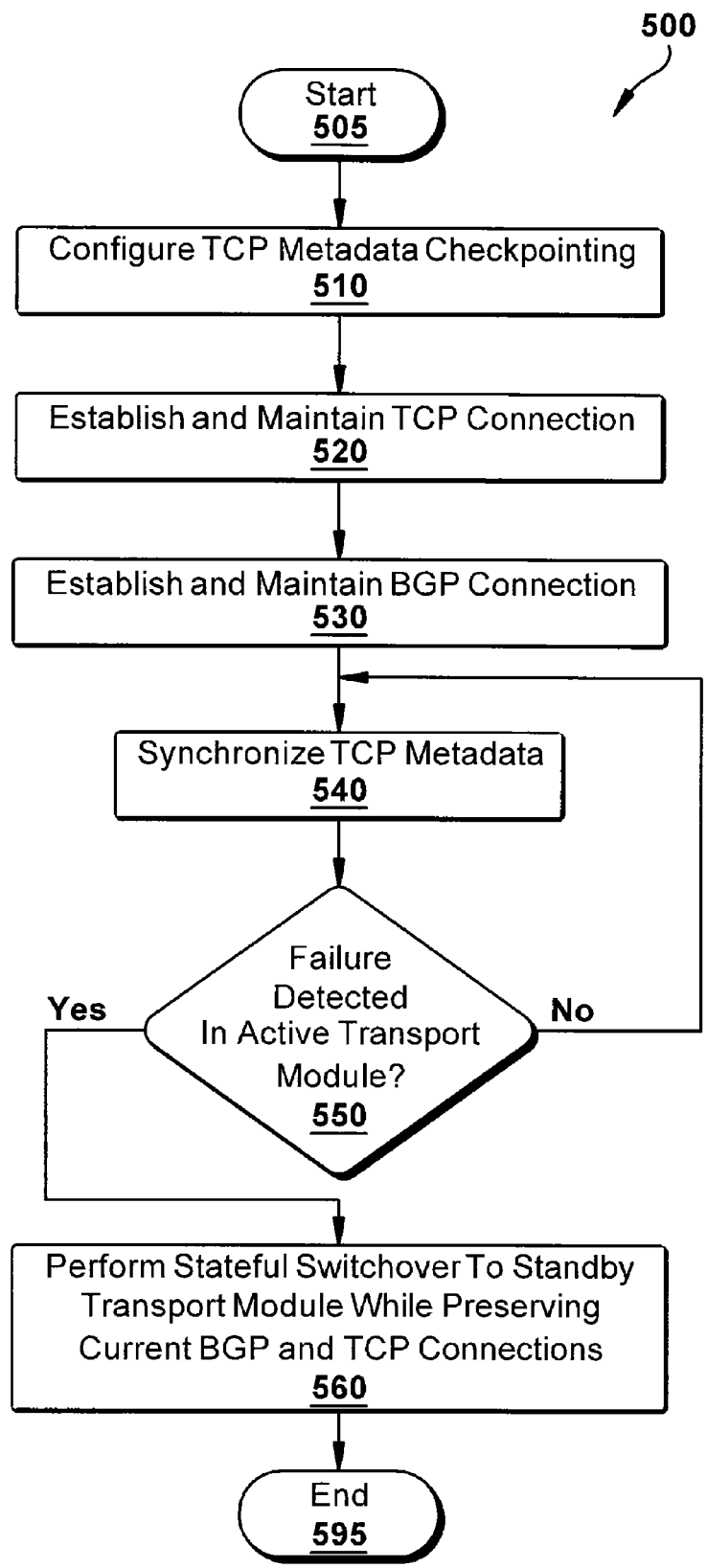
FIG. 5 is a flow chart illustrating a method of cooperative BGP/TCP window management for stateful switchover according to one embodiment of the present invention.

FIG. 5 is a flow chart illustrating a method 500 of cooperative BGP/TCP window management for stateful switchover according to one embodiment of the present invention. One of ordinary skill in the art will recognize other embodiments within the scope of the present invention (e.g., alternative applications to BGP, and alternative transport protocols to TCP). Furthermore, the method 500 can be practiced with less than all of the delineated steps, and in an order other than delineated.

In the illustrative embodiment of FIG. 5, the BGP module 212 configures 510 TCP metadata checkpointing. To do so, according to one embodiment, the BGP module 212 configures the active TCP module 232a for checkpointing metadata without BGP data mirroring. As a result, the BGP message data that are transported in TCP packet payloads are not also replicated to the standby TCP module 232b. In another embodiment, the BGP module 212 configures the TCP module 232a to send non-fragmented PDUs when sending packets with BGP message data.

Figure 6:
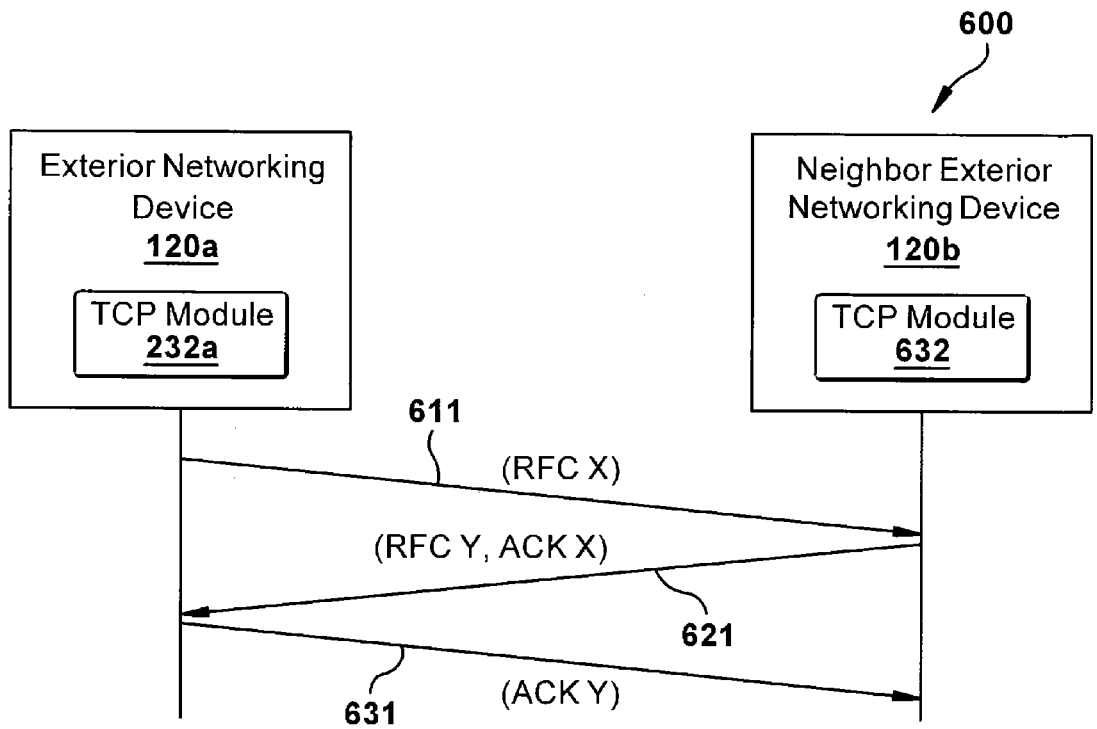
FIG. 6 is a sequence diagram illustrating a method of establishing a TCP connection according to one embodiment of the present invention.

The TCP module 232a establishes 520 and maintains a TCP connection, for example, as shown in FIG. 6. The sequence diagram of FIG. 6 illustrates a method 600 of three-way handshake for establishing a TCP connection according to one embodiment of the present invention. The active TCP module 232a sends a request for communication shown as an RFC X message 611 (e.g., a SYN message) to a TCP module 632 of a neighbor exterior networking device 120b. In response, the neighboring TCP module 632 sends an RFC Y message with an acknowledgement of the RFC X message 611 shown as ACK X 621. Finally, the TCP module 232a returns an acknowledgement that it will also send routing information, shown as ACK Y 631.

Figure 7:
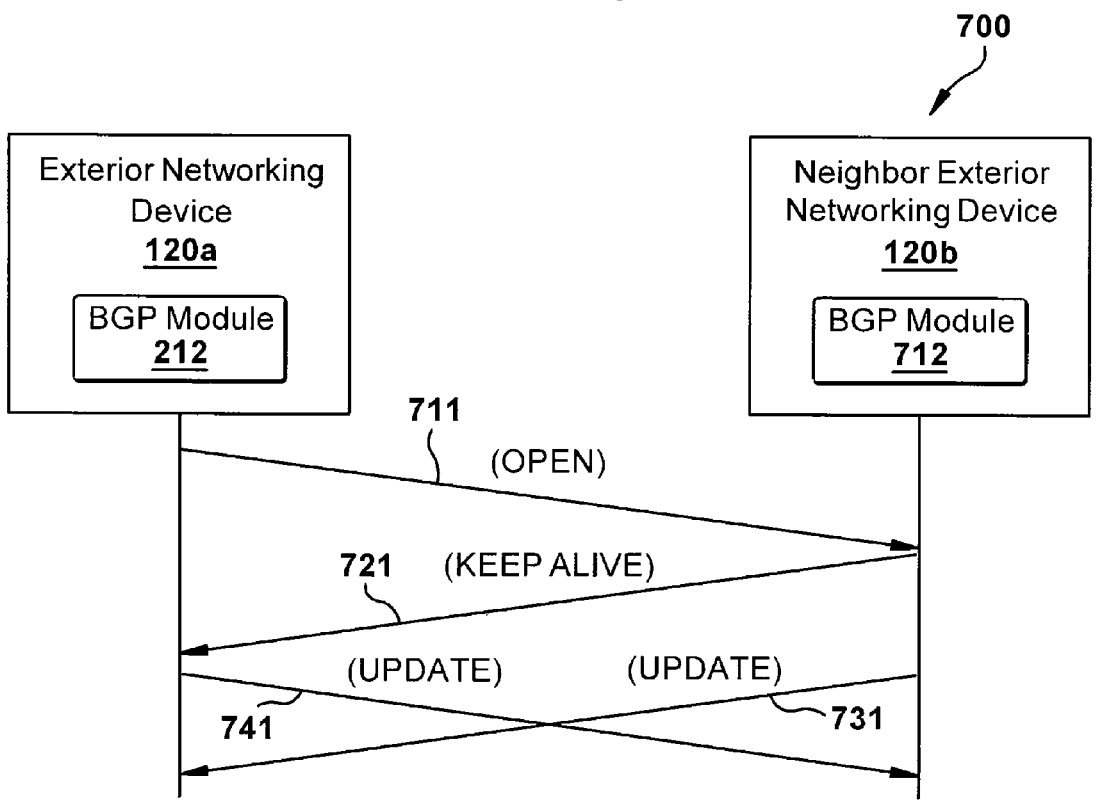
FIG. 7 is a sequence diagram illustrating a method of establishing a BGP connection according to one embodiment of the present invention.

The BGP module 212 establishes 530 and maintains a BGP connection, for example, as shown in FIG. 7. The sequence diagram of FIG. 7 illustrates a method 700 establishing of the BGP connection-according to one embodiment of the present invention. The BGP module 212 sends an OPEN message 711 to a BGP module 712 of the neighbor exterior networking device. In response, the neighboring BGP module 712 sends a KEEPALIVE message 721 that serves as an acknowledgment. Thereafter, either BGP module 212, 712 sends UPDATE messages 731, 741 that contain router information. The UPDATE messages 731, 741 comprise, for example, WITHDRAW message to withdraw routes, a message to advertise new routes, or both.

Figure 8:
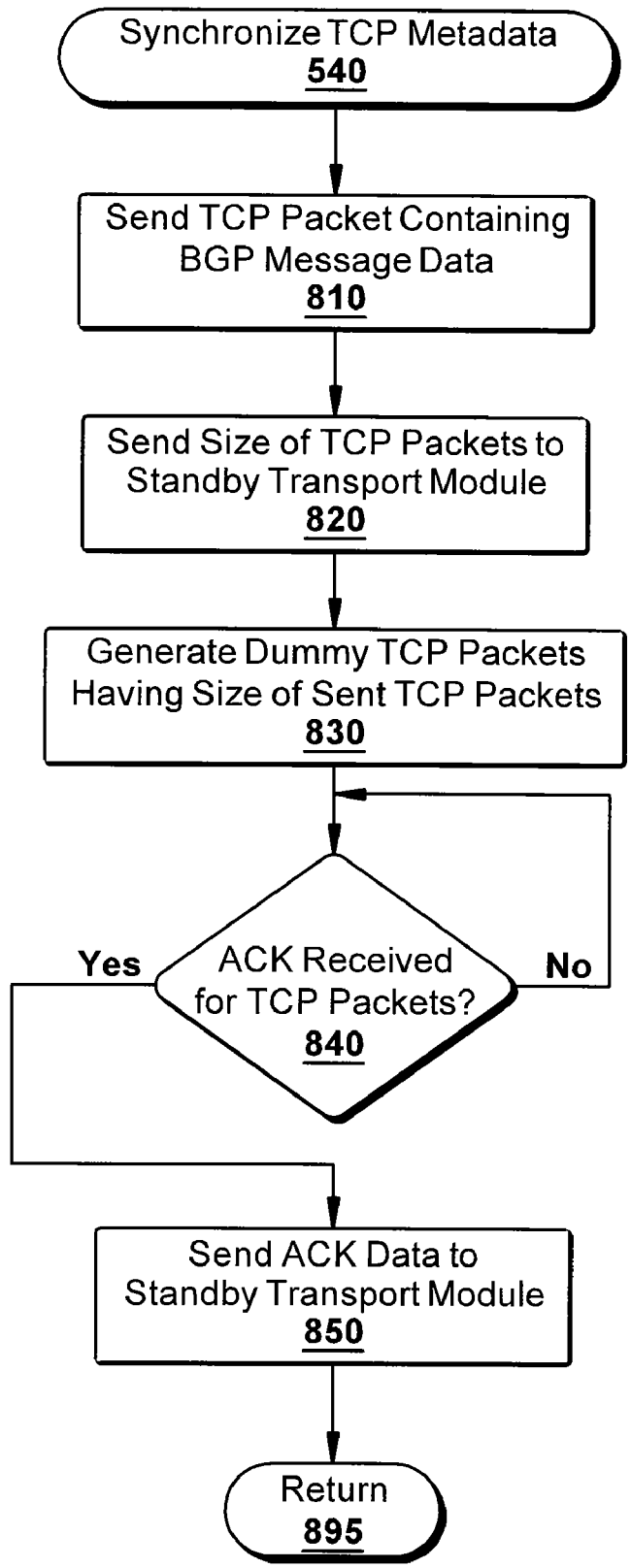
FIG. 8 is a flow chart illustrating the method of synchronizing TCP metadata according to one embodiment of the present invention.

The checkpointing module 233a synchronizes 540 TCP metadata, for example, as shown in FIG. 8. In one embodiment, the active checkpointing module 233a determines TCP packet sizes based on the BGP message data and sends these sizes to the standby checkpointing module 233b. The TCP packets are sent to a neighboring exterior networking device 120b which, upon receipt, returns an ACK message. In one embodiment, the checkpointing module 233a then sends the ACK message or related data to the checkpointing module 233b. Accordingly, the standby transport module 230b is able to effectively mirror the active transport module 230a in an efficient manner with dummy packets.

If the fault detector 220 detects 550 a failure in the active transport module 230a, it performs 560 a stateful switchover to the standby transport module 230b while preserving current TCP and BGP connections. In one embodiment, the fault detector 220 comprises a hardware switch that, responsive to the switchover, routes signals to the standby transport module 230b. In another embodiment, the fault detector 220 comprises software, such a condition loop programmed in software code, which detects a lack of responsiveness from the active transport module 230a.

FIG. 8 is a flow chart illustrating the method 540 of synchronizing TCP metadata according to one embodiment of the present invention. The active TCP module 232a sends 810 a TCP packet containing BGP message data. The active checkpointing module 233a sends 820 a size of the sent TCP packet to the standby checkpointing module 230b. The TCP module 232b generates 830 a dummy TCP packet in the Tx buffer 234b having the size of the sent TCP packet, but without associated BGP message data. When the ACK is received, the checkpointing module 233a sends 840 the ACK or related data to the standby transport module 230b.

Figure 9:
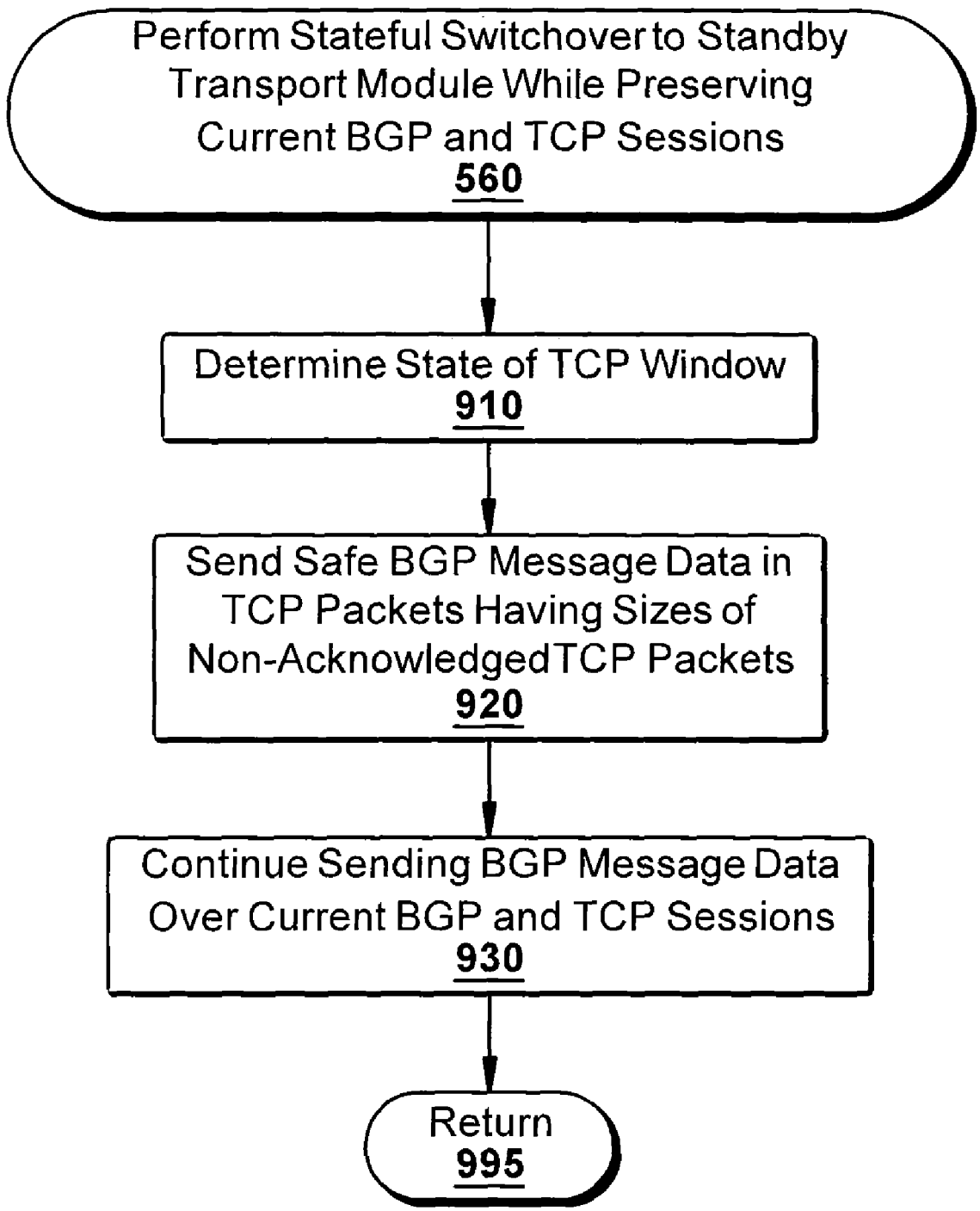
FIG. 9 is a flow diagram illustrating a method of performing stateful switchover to a standby transport module while preserving current BGP and TCP sessions according to one embodiment of the present invention.

FIG. 9 is a flow diagram illustrating the method 560 of performing stateful switchover while preserving BGP and TCP sessions according to one embodiment of the present invention. The checkpointing module 233b determines 910 a state of the TCP windows to define stateful metadata of TCP packets that have yet to be acknowledged as received. The TCP module 232b sends 920 BGP message data in dummy TCP packets having sizes of non-acknowledged TCP packets and safe BGP message data. At this point, stateful switchover has been achieved. This allows the TCP module 232b to continue 930 sending BGP message data over current BGP and TCP connections.

Figure 10:
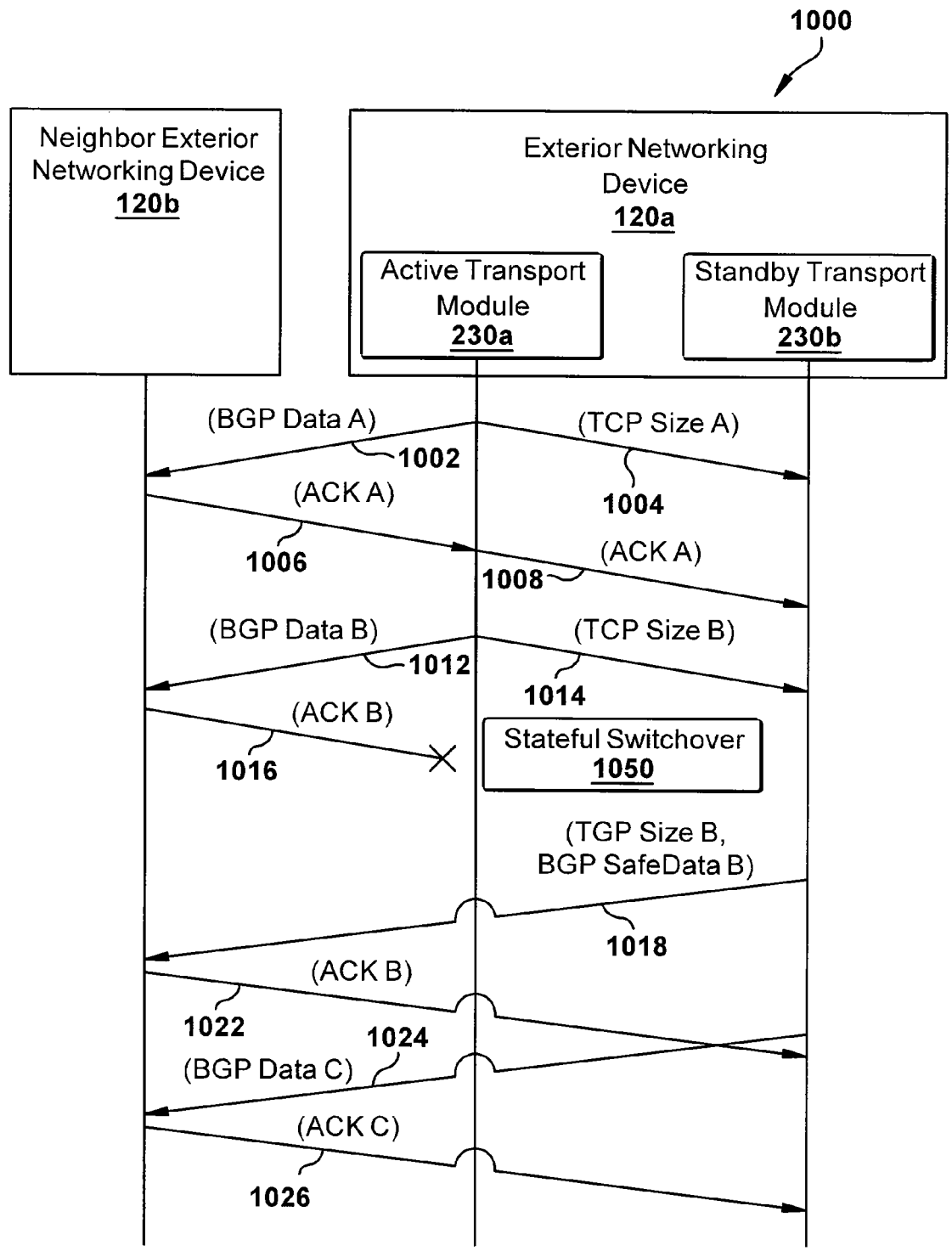
FIG. 10 is a sequence diagram illustrating a method of sending metadata to a standby transport module before a stateful switchover and sending safe BGP data from the standby transport module after the stateful switchover according to one embodiment of the present invention.

FIG. 10 is a sequence diagram illustrating a method 1000 of sending metadata to a standby transport module 230b before a stateful switchover and sending safe BGP data from the standby transport module 230b after the stateful switchover according to one embodiment of the present invention. In a first series of transactions, the active transport module 230a sends BGP data A 1002 to the neighboring exterior networking device 120b, while sending associated metadata comprising a TCP size A 1004 to the standby transport module 230b. When the active transport module 230a receives ACK A 1006, it sends additional metadata with information related to ACK A to the standby transport module 230b. In a second series of transactions, the active transport module 230a sends BGP data B 1012 and TCP size B 1014. However, a stateful switchover 1050 occurs, so ACK B 1016, acknowledging BGP data B 1012, is not received. In response to the stateful switchover, the standby transport module 230b sends a dummy packet using TCP size B and BGP safe data B 1018. This reaffirms both the current BGP and TCP sessions. Thereafter, the standby transport module 230b and the neighbor networking device 120b continue exchanging BGP message data over TCP 1024, 1026.

The above description is included to illustrate the operation of the preferred embodiments and is not meant to limit the scope of the invention. The scope of the invention is to instead be limited only by the following claims.

The invention claimed is:

1. A method for stateful switchover in a networking device including an active transport module and a standby transport module, the method comprising:
    establishing a Border Gateway Protocol (BGP) session between the networking device and an associated neighbor networking device; and
    synchronizing the active transport module with the standby transport module by sending metadata about a Transmission Control Protocol (TCP) window state from the active transport module to the standby transport module;
    the synchronizing further comprises the active transport module sending a TCP packet comprising BGP message data, wherein the active transport module provides metadata to the standby transport module that includes the size of the TCP packet without the message data.

2. The method of claim 1, further comprising:
    detecting a fault;
    performing a stateful switchover from the active transport module to the standby transport module responsive to the fault; and
    performing a stateful switchover from the active transport module to the standby transport module by determining from the metadata which data packets have been sent without yet being acknowledged, and sending a packet having a size of a non-acknowledged packet, the packet comprising safe BGP message data that is harmlessly accepted by the neighbor networking device.

3. The method of claim 2, wherein the safe BGP message data comprises one of a group of consisting of a WITHDRAW message, and a KEEPALIVE message.

4. The method of claim 1, the synchronizing further comprises generating a dummy TCP packet in the standby transport module corresponding to the sent TCP packet, the dummy TCP packet having the same size of the sent TCP packet but without the message data.

5. The method of claim 4, further comprising receiving an Acknowledgement (ACK) responsive to the neighbor networking device receiving the TCP packet; and
wherein the metadata comprises data related to the ACK received from the neighbor networking device.

6. The method of claim 1, further comprising configuring a TCP session to checkpoint metadata without synchronizing BGP data.

7. The method of claim 1, further comprising configuring a TCP session to send a non-fragmented BGP message within a TCP packet.

8. The method of claim 1, further comprising establishing a TCP session with a neighbor networking device to transport BGP message data.

9. An apparatus, comprising:
a Border Gateway Protocol (BGP) module to establish a BGP session with an associated neighbor networking device; and
an active hardware transport module, communicatively coupled to the BGP module, the active transport module comprising a hardware checkpointing module to synchronize the active transport module with a standby hardware transport module by sending metadata about a Transmission Control Protocol (TCP) window state from the active transport module to the standby transport module; wherein the active transport module sends a TCP packet comprising BGP message data, wherein the checkpointing module sends metadata comprising a size of the TCP packet without the corresponding message data to the standby transport module.

10. The apparatus of claim 9, further comprising a hardware fault detector, communicatively coupled to the BGP module and the active transport module, the fault detector to detect a fault and initiate a stateful switchover from the active transport module to the standby transport module responsive to the fault.

11. The apparatus of claim 10, wherein the standby transport module determines from the metadata which data packets have been sent without yet being acknowledged, and sends a packet having a size of a non-acknowledged packet, the packet comprising a safe BGP message data that is harmlessly accepted by the neighbor networking device.

12. The apparatus of claim 11, wherein the safe BGP message data comprises one of a group consisting a WITHDRAW message, and a KEEPALIVE message.

13. The apparatus of claim 9, wherein the standby transport module comprises a transmit buffer to generate a dummy TCP packet corresponding to the sent TCP packet, the dummy TCP packet without the BGP message data but having the same size as the sent TCP packet.

14. The apparatus of claim 9, wherein the active transport module receives an Acknowledgement (ACK) responsive to the neighbor networking device receiving the TCP packet, wherein the checkpointing module sends metadata related to the ACK received from the neighbor networking device to the standby transport module.

15. The apparatus of claim 9, wherein the BGP module configures a TCP session to checkpoint metadata for without synchronizing BGP data.

16. The apparatus of claim 9, wherein the BGP module configures a TCP session to send a non-fragmented BGP message within a TCP packet.

17. The apparatus of claim 9, wherein the active transport module establishes a TCP session with the neighbor networking device to transport BGP message data.

18. A non-transitory computer readable medium encoded with computer executable logic to be executed by a computer comprising:
logic for establishing a Border Gateway Protocol (BGP) session between a networking device and an associated neighbor networking device; and
logic for synchronizing an active transport module with a standby transport module by sending metadata about a TCP window state from the active transport module to the standby transport module;
logic for sending a TCP packet by the active transport module, the TCP packet comprising BGP message data, wherein the active transport module provides metadata to the standby transport module that includes the size of the TCP packet without the message data.

19. The non-transitory computer readable medium of claim 18, the logic for synchronizing further comprises logic for generating a dummy TCP packet in the standby transport module corresponding to the sent TCP packet, the dummy TCP packet having the same size of the sent TCP packet but without the message data.

20. The non-transitory computer readable medium of claim 18, further comprising logic for receiving an Acknowledgement (ACK) responsive to the neighbor networking device receiving the TCP packet, wherein the metadata comprises data related to the ACK received from the neighbor networking device.

* * * * *